Jan. 22, 1946. H. FLEISHER Re. 22,711
KNITTED FABRIC
Original Filed April 15, 1938 2 Sheets-Sheet 1
Fig. 1.
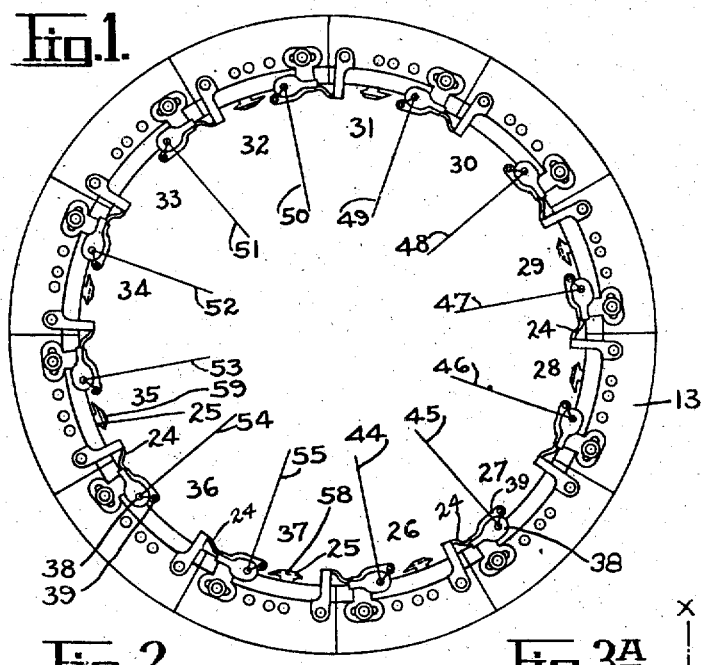
Fig. 2.
| | | | | | | | | | | | |
|---|---|---|---|---|---|---|---|---|---|---|---|
| Needles | | 16 | 17 | 16 | 17 | 16 | 17 | 16 | 17 | - | - |
| Pressers | | 56 | 56 | 57 | 57 | 56 | 56 | 57 | 57 | - | - |
| Wales | | 1 | 2 | 3 | 4 | 5 | 6 | 7 | 8 | | |
| 1 | 44 | T | F | P | F | T | F | P | F | 41 | 58 |
| 2 | 45 | F | I | F | I | F | I | F | I | 40 | X |
| 3 | 46 | P | F | T | F | P | F | T | F | 41 | 59 |
| 4 | 47 | F | T | F | P | F | T | F | P | 40 | 58 |
| 5 | 48 | I | F | I | F | I | F | I | F | 41 | X |
| 6 | 49 | F | P | F | T | F | P | F | T | 40 | 59 |
| 7 | 50 | P | F | T | F | P | F | T | F | 41 | 59 |
| 8 | 51 | F | I | F | I | F | I | F | I | 40 | X |
| 9 | 52 | T | F | P | F | T | F | P | F | 41 | 58 |
| 10 | 53 | F | P | F | T | F | P | F | T | 40 | 59 |
| 11 | 54 | I | F | I | F | I | F | I | F | 41 | X |
| 12 | 55 | F | T | F | P | F | T | F | P | 40 | 58 |
| Courses | Yarns | | | | | | | | | Needle Cam | Presser Cam |
Fig. 3A.
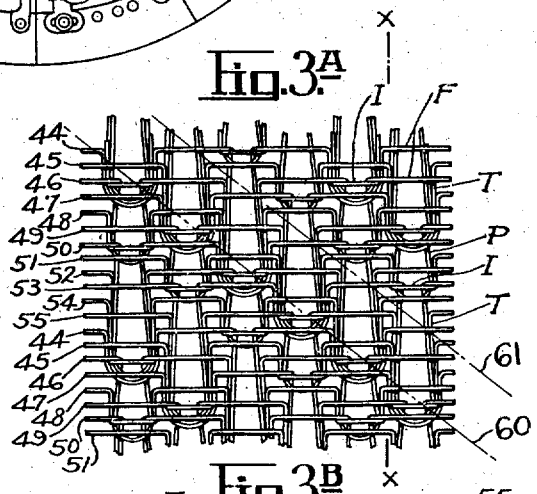
Fig. 3B.
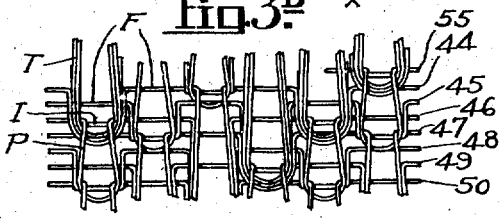
INVENTOR
HARRY FLEISHER
BY
Elfan Spenceler
ATTORNEY

KNITTED FABRIC

Original Filed April 15, 1938 2 Sheets-Sheet 2

INVENTOR
HARRY FLEISHER
BY
ATTORNEY

Reissued Jan. 22, 1946

Re. 22,711

UNITED STATES PATENT OFFICE 22,711

KNITTED FABRIC

Harry Fleisher, Watertown, Conn., assignor to Princeton Incorporated, Watertown, Conn., a corporation of Connecticut Original No. 2,191,883, dated February 27, 1940, Serial No. 202,223, April 15, 1938. Application for reissue May 18, 1945, Serial No. 594,395

10 Claims. (Cl. 66—169)

This invention relates to knitted fabrics, and more particularly to a knitted fabric wherein the threads or yarns constituting the same are arranged in novel repeating sequences of tucks, floats, plain stitches, and loose laid-in yarns.

One object of this invention is to provide a new form of knitted fabric having repeating sequences of tucks, plain stitches and laid-in yarns separated from each other by floats, and producing a plurality of parallel diagonal ridges and grooves on one surface thereof.

A still further object is to provide a novel form of knitted fabric of the above nature which will be relatively simple in construction, easy to manufacture, flexible and elastic, non-crushable, substantially run-resisting, pleasing in appearance, and very efficient and durable in use.

With these and other objects in view, there has been illustrated on the accompanying drawings one form in which the invention may be conveniently embodied in practice.

In the drawings:

Fig. 1 represents a diagrammatic plan view of a circular "twelve feed" knitting machine for producing the improved fabric.

Fig. 2 is a table showing the relative arrangement of the needles, needle pressers, needle cams, presser cams, and the sequence in which the stitches, tucks, floats and laid-in yarns are incorporated in the fabric of this invention.

Fig. 3A is an enlarged view of the rough surface of the improved fabric, the stitches, tucks, floats and laid-in yarns being conventionally shown.

Fig. 3B is a similar view of the reverse smooth side of the fabric, the left-hand edge of the figure corresponding to the line X—X in Fig. 3A.

Figure 4:
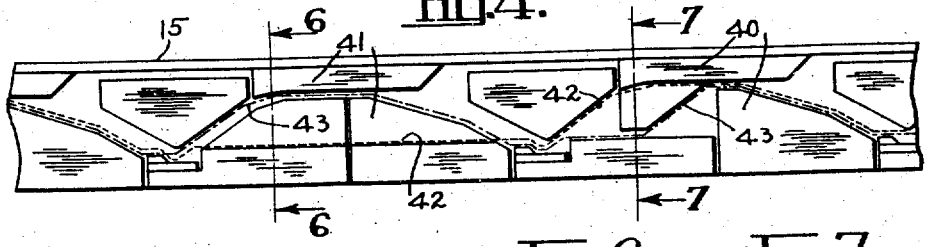
Fig. 4 is a development view of a portion of the needle-actuating stationary cylinder cam used in the knitting machine.

Referring now to the drawings, wherein like reference numerals denote corresponding parts throughout the several views, the numeral 10 (Fig. 5) indicates a circular stationary base or table upon which are mounted a plurality of upstanding angle brackets 11 in circular formation. The brackets 11 support a stationary ring member 12, which carries a plurality of horizontal arcuate plates 13 forming a segmental substantially circular sinker-operating cam member.

Figure 5:
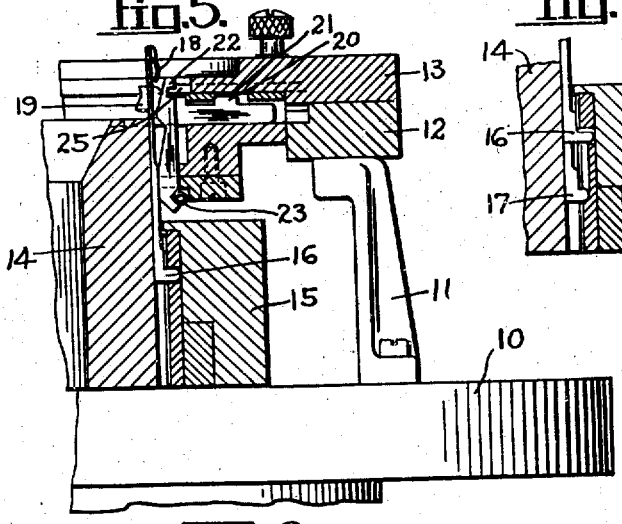
Fig. 5 is an enlarged vertical sectional view of a portion of the knitting machine.
Figure 6:
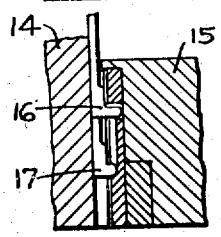
Fig. 6 is a sectional view of a portion of the needle-actuating cam, taken on the line 6—6 of Fig. 4.
Figure 7:
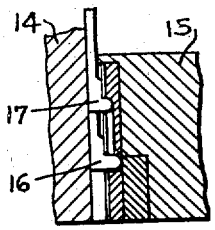
Fig. 7 is a sectional view of another portion of the needle-actuating cam, taken on the line 7—7 of Fig. 4.
Figure 10:
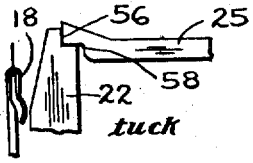
Fig. 10 is a similar view showing the engagement of a low-cut presser cam with a high-cut presser, the needle beard remaining open for making a tuck.
Figure 11:
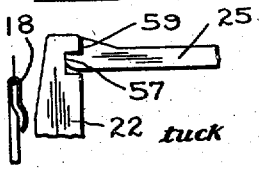
Fig. 11 is a similar view showing the engagement of a high-cut presser cam with a low-cut presser, the needle beard remaining open for producing a tuck.
Figure 12:
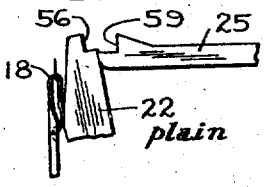
Fig. 12 is a similar view showing the engagement of a high-cut presser cam with a high-cut presser, resulting in the closing of the needle beard and the casting off of a stitch.

Provision is also made of a needle-carrying cylinder 14 which is adapted to rotate within a stationary annular needle-actuating cylinder cam 15—the latter being rigidly secured to the stationary table 10 in the usual manner and located below the level of the stationary ring member 12. The rotary needle cylinder 14 carries a plurality of long butt needles 16 and short butt needles 17 which are arranged alternately around the circumference of the needle cylinder 14. The needles 16 and 17 are adapted to be successively engaged by the grooves of the cylinder cam 15 (see Figs. 4–7) to cause said needles to travel upwardly and downwardly during the operation of the machine. Each of the needles 16 and 17 is provided at its upper end with a spring beard 18 which, when in the open position shown in Figs. 5, 10 and 11, is adapted on its downward stroke to catch the yarn or thread.

Operating between the successive needles 16 and 17 are a series of horizontal reciprocating sinkers 19, which are provided on their upper edges with substantially rectangular projections 20 adapted to travel within a horizontal cam groove 21 formed in the sinker-operating arcuate cam plates 13. The cam groove 21 serves to control the outward and inward movement of the sinkers 19 at the proper times.

Provision is also made of a series of pivotally mounted vertical pressers 22 which are adapted to close the spring beards 18 of the needles 16 and 17 when engaged by a plurality of presser cams 25, herein shown as located at certain selected ones of the twelve knitting points. In order to hold the pressers 22 away from the spring beards 18 of the needles 16 and 17 except when engaged by said presser cams 25, provision is made of a circular coiled spring 23 which surrounds the lower notched ends of said pressers 22. To line up the pressers 22 just in advance of the knitting points, provision is made of a plurality of guide cams 24 (see Fig. 1), which serve to direct said pressers 22 into position and avoid striking the stationary yarn carriers as the pressers revolve past said carriers.

The T-shaped presser cams 25 serve to push the pressers 22 against the spring beards 18 of the needles 16 and 17 as they pass by so that the yarn will be knitted off the needles to form stitches. It will be understood, however, that the presser cams 25 are omitted or released at certain points so that at said points the thread or yarn will not be knitted off, but will be carried in the needle beards to a later station where the yarn will be "knitted off" and there inlaid with the thread or yarn of this course forming a "tuck."

For producing the improved fabric of this invention, the machine is provided with twelve knitting stations 26, 27, 28, 29, 30, 31, 32, 33, 34, 35, 36 and 37, to each of which different threads or yarns are fed through guides 38 and 39. As most clearly shown in Fig. 4, the cylinder cam 15 is provided with a plurality of sets of needle-actuating cams 40 and 41 to control the up and down motion of the alternating short butt and long butt needles 17 and 16, respectively. Two different arrangements are employed, as indicated in Fig. 4, wherein the dotted line 42 represents the movements of the short butt needles 17, and the dot-and-dash line 43 represents the movements of the long butt needles 16. At the cam set 40, only the short butt needles 17 will be held up, and at the cam set 41, only the long butt needles 16 will be held up.

Figure 8:
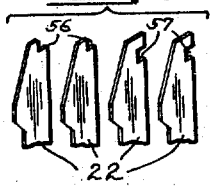
Fig. 8 is a fragmentary perspective view of four of the needle beard pressers arranged in the proper sequence to produce the knitted fabric of this invention.

As indicated in the table shown in Fig. 2 the yarns 44–55 inclusive, which are being fed to the knitting stations 26–37 inclusive, respectively, in twelve courses, are acted upon by the long and short butt needles 16 and 17 in accordance with the particular arrangement and setting of the pressers 22, needle cam sets 40 and 41, and presser cams 25, at the respective stations. The pressers 22 for acting upon the alternating long and short butt needles 16 and 17 are arranged in alternating pairs, as indicated in Figs. 2 and 8; i. e., first, two pressers with high cuts 56, and then two pressers having low cuts 57. At the first course (or station 26), the presser cam 25 is provided with a low cut 58. At the second course (or station 27), the presser cam 25 is omitted (as indicated by an X in the last vertical column of the table in Fig. 2), whereby the pressers 22 will be held in inoperative position by the spring 23.

At the third course (or station 28) the presser cam 25 is provided with a high cut 59, and at the fourth course (or station 29) the presser cam has a low cut 58. At the fifth course (or station 30) the presser cam 25 is again omitted and at the sixth and seventh courses (or stations 31 and 32), respectively, the presser cams 25 are each provided with a high cut 59.

At the eighth course (or station 33), the presser cam 25 is again omitted, and at the ninth course (or station 34) the presser cam 25 has a low cut 58. At the tenth course (or station 35) the presser cam 25 is provided with a high cut 59. The presser cam 25 is omitted at the eleventh course (or station 36), and the presser cam 25 at the twelfth course (or station 37) has a low cut 58.

Throughout the machine the stationary needle-actuating cylinder cam sets 40 and 41 are alternated, the cam set 41 which raises all the long butt needles 16 being located at all odd numbered courses, and the cam set 40 which raises the short butt needles 17 being located at all even numbered courses.

Figure 9:
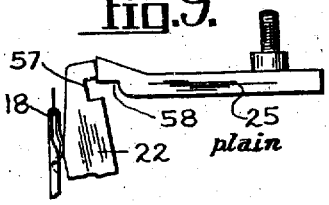
Fig. 9 is a fragmentary side view showing the engagement of a low-cut presser cam with a low-cut presser, the needle beard being closed and casting off a stitch.

Referring now to Figs. 9, 10, 11 and 12, the pressers and presser cams are so arranged that whenever a low-cut presser 22 engages a low-cut presser cam 25, as shown in Fig. 9, the needle spring beard will be closed and the yarn will be cast off forming a stitch. The same result will take place when a high-cut presser engages a high-cut presser cam (see Fig. 12). When, however, oppositely cut pressers 22 and presser cams 25 engage each other, as shown in Figs. 10 and 11, the beards 18 of the needles 16 and 17 will remain open and "tucks" will occur.

In accordance with the above construction, the yarn 44 at the first course will be "tucked" at the first wale (indicated at T in the table of Fig. 2) due to the engagement of a presser 22 having a high cut 56 with a presser cam 25 having a low cut 58, then floated on the opposite surface of the fabric at the second wale (indicated at F in said table) due to the short butt needle 17 being held down in inoperative position. A plain stitch will occur at the third wale (indicated at P) due to the engagement of a presser 22 having a low cut 57 with a presser cam 25 having a low cut 58; the yarn will be floated at the fourth wale. This sequence of operations repeats every four wales across the fabric.

At the second course, the yarn 45 will be floated (F) at all odd numbered wales due to the omission of the presser cam 25 at the second station 27. At the even numbered wales of the second course the yarn will be picked up by the short butt needles 17 which are raised at these wales, and loosely "laid-in" the fabric (indicated at I in Fig. 2). This sequence repeats every two wales across the fabric. It will be noted that a "laid-in" yarn differs from a tucked yarn in that the laid-in yarn is not knitted off after any float, whereas a tucked yarn is knitted off at least once in each course, and, in the specific fabric disclosed herein, is knitted off after every other float. A tucked yarn further differs from a laid-in yarn in that it is embedded relatively tightly in the fabric, whereas a laid-in yarn is comparatively loose.

The yarn 46 at the third course is stitched (P) at the first wale due to the fact that long butt needles 16 are raised by the cam set 41 and to the engagement of the high-cut presser 22 and high-cut presser cam 25, respectively; a float F occurs at the second wale, then a tuck T at the third wale due to the engagement of a low-cut presser 22 and a high-cut presser cam 25. A float will also occur at the fourth wale. This sequence of operations repeats every four wales.

At the fourth course, the yarn 47 is floated (F) at the first wale, tucked (T) at the second, due to engagement of a high-cut presser 22 with a low-cut presser cam 25, then floated (F) at the third wale and stitched (P) at the fourth wale due to the engagement of a low-cut presser 22 and a low-cut presser cam 25. This sequence repeats every four wales.

In the fifth course the yarn 48 is loosely laid-in (I) the fabric at all odd numbered wales due to the omission of the presser cam, and floated (F) at all alternate even numbered wales.

At the sixth course the yarn 49 is floated (F) at the first wale, stitched (P) at the second wale, due to the engagement of a high-cut presser 22 with a high-cut presser cam 25; floated (F) at the third wale and tucked (T) at the fourth wale, due to the engagement of a low-cut presser 22 and a high-cut presser cam 25. This sequence also repeats every four wales.

At the seventh course, the yarn 50 is acted upon exactly as was the yarn 46 at the third course, the needles, needle cams, pressers and presser cams being arranged in the same manner.

At the eighth course, the yarn 51 is acted upon exactly as was the yarn 45 at the second course, the needles, needle cams, pressers, and presser cams being arranged in the same manner.

At the ninth course, the yarn 52 is acted upon exactly the same as was the yarn 44 at the first course, the needles, needle cams, pressers, and presser cams being arranged the same.

The yarns 53, 54 and 55 at the tenth, eleventh and twelfth courses, respectively, are acted upon exactly the same as were the yarns 49, 48 and 47 at the sixth, fifth and fourth courses, respectively, the needles, needle cams, pressers and presser cams being arranged in the same manner.

From the table shown in Fig. 2 it will be observed that the above operations will result in a fabric having two series of diagonally disposed rows of successive floats which cross each other at alternate wales. Parallel to the diagonal rows of floats extending upwardly to the right are a series of diagonally disposed plain stitches and laid-in yarns starting at the third, seventh and eleventh courses, arranged in the following sequences, respectively: P—I—P,

P—P—I—P—P—I—P and I—P—P—I—P—P—I—P. Moreover, a series of diagonally disposed tucks and laid-in yarns, starting at the first, fifth and ninth courses, are arranged in the following sequences, respectively: T, I—T—T—I—T, and

T—I—T—T—I—T—T—I

Similar rows of tucks, plain stitches and in-lays are disposed parallel to the diagonal rows of floats which extend downwardly to the right. Thus, at every two rows starting at the first, third, fifth and seventh, ninth and eleventh courses, the following sequences appear:

T—I—T—P—I—P—T—I
P—T—I—T—P—I—P—T

I—P—T—I—T—P—I—P, P—I—P—T—I—T, and T—P—P, and I—T, respectively.

The improved knitted fabric thus formed is shown greatly enlarged and with its yarn spread apart in Figs. 3A and 3B, from which it will be noted that the "tucked" and "laid-in" yarns form diagonally disposed ridges indicated by a dot and dash line 60, separated by floated yarns forming diagonally disposed valleys indicated by a dot and dash line 61 alternating with said ridges.

The above described sequence of the twelve courses shown will be repeated in each succeeding set of twelve courses, producing a knitted fabric of repeating courses and wales as long as the machine continues to operate. The floats are on the side of the fabric shown in Fig. 3A.

While there has been disclosed in this specification one form in which the invention may be embodied, it is to be understood that this form is shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. A run-resisting knitted fabric repeating every twelve courses and four wales in which a yarn in every other wale in every course is floated, the floats of even numbered courses being located at odd numbered wales and the floats of odd numbered courses being located at even numbered wales, producing two groups of diagonal rows of floats crossing each other at right-angles throughout the fabric, the yarn at each of the second, fifth, eighth and eleventh courses comprising a series of inlays alternating with the floats.

2. A run-resisting knitted fabric repeating every twelve courses and four wales in which a yarn in every other wale in every course is floated, the floats of even numbered courses being located at odd numbered wales and the floats of odd numbered courses being located at even numbered wales, producing two groups of diagonal rows of floats crossing every other at right-angles throughout the fabric, the yarn at each of the second, fifth, eighth and eleventh courses comprising a series of inlays alternating with the floats, and wherein the diagonal rows of floats which extend upwardly to the right are interposed first with a series of yarns having the repeating sequence P—I—P—P—I—P, and then with a series of yarns having the repeating sequence T—I—T—T—I—T throughout the fabric.

3. A run-resisting knitted fabric repeating every twelve courses and four wales, in which a yarn in every other wale in every course is floated, the floats of even numbered courses being located at odd numbered wales and the floats of odd numbered courses being located at even numbered wales, producing two groups of diagonal rows of floats crossing each other at right-angles throughout the fabric, the yarn at each of the second, fifth, eighth and eleventh courses comprising a series of inlays alternating with the floats, and wherein the diagonal rows of floats which extend upwardly and to the left are alternated with a series of yarns having the repeating sequence T—I—T—P—I—P throughout the fabric.

4. A run-resisting knitted fabric repeating every twelve courses and four wales, in which a yarn in every other wale in every course is floated, the floats of even numbered courses being located at odd numbered wales and the floats of odd numbered courses being located at even numbered wales, producing two groups of diagonal rows of floats crossing each other at right-angles throughout the fabric, the yarn at each of the second, fifth, eighth and eleventh courses comprising a series of inlays alternating with the floats, wherein the diagonal rows of floats which extend upwardly and to the right are interposed first with a series of yarns having the repeating sequence P—I—P—P—I—P and then with a series of yarns having the repeating sequence

T—I—T—T—I—T throughout the fabric, and wherein the diagonal rows of floats which extend upwardly and to the left are alternated with a series of yarns having the repeating sequence T—I—T—P—I—P throughout the fabric.

5. A run-resisting knitted fabric repeating every twelve courses and four wales in which a yarn in every other wale in every course is floated, the floats of even numbered courses being located at odd numbered wales and the floats of odd numbered courses being located at even numbered wales, said fabric also being made up of tucks, plain stitches and inlays arranged in repeating sequences alternating with the floats in the first wale, T—P—I—P—T—I; in the second wale,

I—T—P—I—P—T;

in the third wale, P—T—I—T—P—I; and in the fourth wale, I—P—T—I—T—P.

6. A knitted fabric comprising a plurality of courses having yarns floated at every even numbered wale and alternating with a plurality of courses having yarns floated at every odd numbered wale, and wherein every third course comprises a series of alternately floated and laid-in yarns, the remaining courses of said fabric comprising a series of tucks and plain stitches alternating with the floats.

7. A knitted fabric repeating every twelve courses and every four wales comprising a plurality of courses having yarns floated at every even numbered wale alternating a plurality of courses with yarns floated at every odd numbered wale, and wherein every third course comprises a series of alternately floated and laid-in yarns, the remaining courses of said fabric comprising a series of tucks and plain stitches alternating with the floats, said tucks and stitches being disposed at every odd numbered wale in the first, third, seventh and ninth course, and disposed at every other even numbered wale in the fourth, sixth and tenth course.

8. A knitted fabric repeating every twelve courses and every four wales comprising a plurality of courses having yarns floated at every even numbered wale and alternating with a plurality of courses having yarns floated at every odd numbered wale, and wherein a series of alternately floated and laid-in yarns is disposed at the second, fifth, eighth and eleventh courses, and a series of tucks and plain stitches alternating with the floats are alternately disposed in the other courses, said tucks and stitches being disposed at the every other odd numbered wale in the first, third, seventh and ninth courses, and disposed at every other even numbered wale in the fourth, sixth and tenth courses.

9. A knitted fabric repeating every twelve courses and four wales comprising a plurality of courses having the yarn floated at every even numbered wale and alternating with a plurality of courses having yarn floated at every odd numbered wale and wherein a series of alternately floated and laid-in yarns is disposed at the second, fifth, eighth and eleventh courses, the floated yarns in the second and eighth courses being disposed at the odd numbered wales and in the fifth and eleventh courses at the even numbered wales, and wherein a series of tucks and plain stitches alternating with floats are disposed in the other courses, said tucks and stitches being located at the every other odd numbered wale in the first, third, seventh and ninth courses and disposed at every other even numbered wale in the fourth, sixth, and tenth courses.

10. A knitted fabric repeating every twelve courses and four wales in which the yarns of the fabric are made up of tucks, plain stitches, floats and inlays, arranged as follows: first and ninth courses, T—F—P—F; second and eighth courses, F—I—F—I; third and seventh courses,

P—F—T—F;

fourth and twelfth courses, F—T—F—P; fifth and eleventh courses, I—F—I—F; and sixth and tenth courses, F—P—F—T.

HARRY FLEISHER.